United States Patent
Gulati

(10) Patent No.: US 11,060,526 B2
(45) Date of Patent: Jul. 13, 2021

(54) THRUST BEARINGS FOR CENTRIFUGAL PUMPS

(71) Applicant: BL Technologies, Inc., Minnetonka, MN (US)

(72) Inventor: Manmohan Singh Gulati, Eden Prairie, MN (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 49 days.

(21) Appl. No.: 15/839,207

(22) Filed: Dec. 12, 2017

(65) Prior Publication Data
US 2018/0100513 A1    Apr. 12, 2018

Related U.S. Application Data

(62) Division of application No. 14/136,175, filed on Dec. 20, 2013, now Pat. No. 9,874,216.

(51) Int. Cl.
*F04D 29/056* (2006.01)
*F04D 1/06* (2006.01)
(Continued)

(52) U.S. Cl.
CPC ............ *F04D 29/056* (2013.01); *F04D 1/06* (2013.01); *F04D 29/0413* (2013.01); *F04D 29/061* (2013.01)

(58) Field of Classification Search
CPC ........ F04D 1/06; F04D 29/046; F04D 29/047; F04D 29/0473; F04D 29/0476;
(Continued)

(56) References Cited

U.S. PATENT DOCUMENTS 3,048,456 A    8/1962 Gruber
3,142,519 A *  7/1964 Abramovitz ............ F16C 17/06
                                               384/308
(Continued)

FOREIGN PATENT DOCUMENTS

JP    S58-129093 U    9/1983
JP    2003-166496 A   6/2003
(Continued)

OTHER PUBLICATIONS

Advanced Materials I Waukesha Bearings Ceramic and Polymer Bearings, pp. 1-3, downloaded on Nov. 2, 2015.
(Continued)

*Primary Examiner* — Kenneth Bomberg
*Assistant Examiner* — Julian B Getachew

(57) ABSTRACT

A bearing assembly for a centrifugal pump is configured to accommodate both forward and reverse axial thrust, and to be lubricated by process fluid. A pump incorporating a dual acting bearing assembly that is lubricated by process fluid and that is located between the final two impeller stages of the pump. A desalination system comprises a pump with an inlet for receiving seawater at a first end, an outlet for discharging high pressure seawater at a second end, one or more impellers coupled to a rotatable shaft between the first end and the second end for increasing a pressure of the seawater, and a bearing assembly lubricated by the seawater for absorbing axial thrust in both directions along the shaft.

8 Claims, 4 Drawing Sheets

(51) Int. Cl.
*F04D 29/06* (2006.01)
*F04D 29/041* (2006.01)

(58) Field of Classification Search
CPC .. F04D 13/10; F04D 29/0413; F04D 29/0513; F04D 5/003; F04D 17/12; F04D 19/02; F16C 17/04; F16C 17/06; F16C 17/065; F16C 33/1025; F16C 33/1045; F16C 2360/44
See application file for complete search history.

(56) References Cited

U.S. PATENT DOCUMENTS

| | | | |
|---|---|---|---|
| 3,364,866 A | | 1/1968 | Tetsuya |
| 4,219,917 A * | | 9/1980 | Bearden ............... F04D 1/06 29/888.024 |
| 5,033,937 A | | 7/1991 | Wilson |
| 6,309,174 B1 | | 10/2001 | Oklejas, Jr. et al. |
| 8,016,571 B2 * | | 9/2011 | Speer ............... F04D 1/063 384/420 |
| 8,147,692 B2 | | 4/2012 | Oklejas, Jr. |
| 2010/0215299 A1 * | | 8/2010 | Waki ............... F01D 25/18 384/307 |
| 2013/0082000 A1 | | 4/2013 | D'Artenay et al. |

FOREIGN PATENT DOCUMENTS

| | | |
|---|---|---|
| JP | 2009-103109 A | 5/2009 |
| WO | 2009018560 A2 | 2/2009 |
| WO | 2010098003 A1 | 9/2010 |

OTHER PUBLICATIONS

Chinese Patent Application No. CN201480069898.6, Office Action dated Jul. 3, 2017.
HIPERAX thrust bearings made using VICTREX PEEK Polymer Provide Excellent Tribological Properties and Wearresistance in Harsh Pumping Environments, [online[, Feb. 12, 2008. [retrieved on Dec. 3, 2013]. 1 page.
International Patent Application No. PCT/US2014/068978, International Search Report dated Mar. 9, 2015.
Kadaj, "High Pressure Pumping", Energy Recovery Inc. (ERI), Pumps & Systems Magazine, pp. 1-3, downloaded on Nov. 2, 2015 at [online], Retrieved from the Internet.
Modular Tilting Pad Thrust Bearings, Compact Equalized-CQ Range, Waukesha Bearings, 2003-2012, pp. 1-16.
U.S. Appl. No. 14/136,175, Non-Final Office Action dated Feb. 27, 2017.
U.S Appl. No. 14/136,175, Notice of Allowance dated Sep. 14, 2017.
Chinese Patent Application No. CN201480069898.6, Office Action dated Jul. 19, 2018.
Japanese Patent Application No. 2016-539279, Office Action dated Oct. 31, 2017.
International Patent Application No. PCT/US2014/068978, International Preliminary Report on Patentability dated Jun. 21, 2016.
International Patent Application No. PCT/US2014/068978, International Search Report dated Jun. 1, 2015.
International Patent Application No. PCT/US2014/068978, Written Opinion dated Jun. 1, 2015.
European Patent Application No. 14821958.7, Office Action dated Jul. 27, 2018.
Indian Patent Application No. 201647022430, Office Action dated Jul. 29, 2019.
Canadian Patent Application No. 2,934,248, Office Action dated Nov. 12, 2020.

* cited by examiner

THRUST BEARINGS FOR CENTRIFUGAL PUMPS

CROSS-REFERENCE TO RELATED APPLICATIONS

This application is a division of U.S. application Ser. No. 14/136,175, filed Dec. 20, 2013, which is incorporated by reference.

TECHNICAL FIELD

The present disclosure relates generally to thrust bearings for centrifugal pumps. In particular, the present disclosure relates to process fluid-lubricated thrust bearings for accommodating both forward and reverse axial thrust in centrifugal pumps.

BACKGROUND

Centrifugal pumps comprise rotating elements within a pump casing that increase the pressure of fluids traveling from an inlet port to a discharge port. One or more impellers are mounted on a shaft within the pump casing and increase the pressure on the fluid as the fluid travels through the casing. A motor drives the shaft to provide the rotating movement.

Some types of centrifugal pumps, which may be referred to as barrel pumps, use a plurality of impeller stages mounted on a common shaft. The impellers face the same direction and successively increase the pressure of process fluid as it flows through the stages.

Various forces act on the impeller shaft during operation of the pump. Forces acting along a direction parallel to the shaft's axis of rotation may be referred to as axial forces, and forces acting perpendicular to the axis may be referred to as radial forces. A long shaft must typically be radially supported at intermediate points along its length to prevent excessive sagging or curvature. Many pumps utilize bushings that closely fit around the shaft are mounted between the impellers to counteract radial forces and to maintain the desired radial position of the shaft.

Axial thrust also acts on the impellers during operation. The axial thrust is additive for each impeller, and very strong axial forces may develop along the shaft, depending on the number of stages. Each stage comprises an impeller (i.e. a rotating element coupled to be driven by the shaft) and a diffuser (i.e., a stationary element within the casing to promote smooth flow of fluid). All of the stages are housed in the casing. An axial force generated by the difference between the low pressure at the inlet of the pump and the high pressure at the outlet of the pump can also act on the shaft in the same direction as the axial thrust generated by each impeller. Axial forces in this direction may be referred to as active loads.

Pumps used in some systems, such as for example reverse osmosis systems, can also be subjected to axial force in the opposite direction, which is sometimes referred to as a "reverse load". Such reverse load can occur, for example, when the pump is turned off, if the pressure downstream of the pump drops rapidly, or in other situations. For example, reverse loads can occur if a pump is started accidentally or improperly (e.g., with a discharge valve fully open), or if a check valve downstream from the pump in a reverse osmosis system is malfunctioning.

FIG. 1 shows an example of a basic desalination system 10 according to the prior art. Low pressure untreated water 11, which may for example be sea water, is provided to the inlet port of a high pressure pump 12. The pump 12 increases the pressure of the water to provide high pressure untreated water 13 to a reverse osmosis (RO) unit 14. In large scale desalination systems, the pressure at the outlet port of the pump 12 may be several hundred psi or more greater than the pressure at the inlet port of the pump, so as to overcome the osmotic pressure of salt in sea water and maximize the output of treated water. The RO unit 14 outputs treated water 15 with a relatively low salt concentration and condensate 16 with a relatively high salt concentration. During normal operation, the shaft of the pump 12 is subjected to an active load in the direction indicated by arrow 17. The shaft of the pump 12 may also be periodically subjected to a reverse load in the direction indicated by arrow 18. The pump 12 typically has a bearing assembly (not shown) for accommodating active loads, and a pressure bleed-off circuit 19 that provides the discharge pressure at or near the outlet to a balancing drum or disk closer to the inlet of the pump in order for accommodating reverse loads.

The condensate 16, which exits the RO unit 14 with a relatively high pressure, optionally passes through an energy recovery device (ERD) 21, and exits through a valve 22 as low pressure condensate 23. The ERD 21 uses the pressure of the high pressure condensate 16 to increase the pressure of a secondary stream of untreated water 11A, which exits the ERD 21 as high pressure untreated water 24, which joins with the high pressure untreated water 13 from the pump 12 and is provided to the RO unit 14. A circulation pump 25 may be provided to circulate the high pressure untreated water 24. Such a system may be more susceptible to reverse loading because of the pressure of the high pressure untreated water 24.

U.S. Pat. No. 6,309,174 discloses a thrust bearing for multistage centrifugal pumps that has a balance disk coupled to the pump shaft within a bearing cavity separated from a discharge chamber of the pump by a sidewall. Throttle ports are provided through the sidewall, which are configured to control the flow rate of process fluid therethough as the balance disk moves axially to allow pressure to build up and be relieved from a pressure cavity between the balance disk and the sidewall to control the axial position of the balance disk. Sealing lands on the sidewall are provided to take up axial loads not accommodated by the fluid pressure on the balance disk. Such a bearing has only limited capacity to take up reverse loads, which are only accommodated by the fluid pressure on the balance disk.

The inventor has determined a need for pumps with improved bearing assemblies.

SUMMARY

This specification will describe a water bearing assembly adapted to resist both forward and reverse thrust. This bearing assembly may be used, for example, in a high pressure turbine/barrel pump. In this context, the bearing assembly provides an alternative to oil lubricated pumps, which require more maintenance than water bearings. The inventor has observed that prior art systems utilizing oil lubricated thrust bearings typically require a bearing frame assembly to retain the lubrication oil, and can be expensive to maintain. Further, the oil must generally be replaced regularly, due to contamination such as for example by dust and/or condensation of environmental moisture. Sometimes the bearing frame assembly must also be replaced. Dual acting bearing assemblies according to certain embodiments are lubricated by the process fluid flowing in the pump, and advantageously avoid problems associated with oil lubricated bearings.

This specification also describes a desalination system that uses a pump with the dual acting water bearing system. This desalination system does not depend on a pressure bleed-off circuit to protect the pump from reverse loads. Optionally, the pressure bleed-off circuit might even be removed. The inventor has observed that bleed-off circuits can deteriorate over time (for example the reaction time of the circuit may increase due to clogging caused by water contamination, etc.), causing damage to a conventional pump. The bleed-off lines have to be chemically cleaned periodically involving maintenance costs and lost productivity due to downtime. If left unattended, blockage in the bleed-off lines accumulates over time until the pump fails unexpectedly. The inventor believes that a dual acting bearing assembly as described herein could increase the reliability of a desalination system.

Although the reverse thrust is less than the forward thrust, the bearing system may be symmetrical. In this way, there is no chance of the bearing being installed in a reverse orientation that would lead to pump failure.

Further aspects and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

Figure 1:
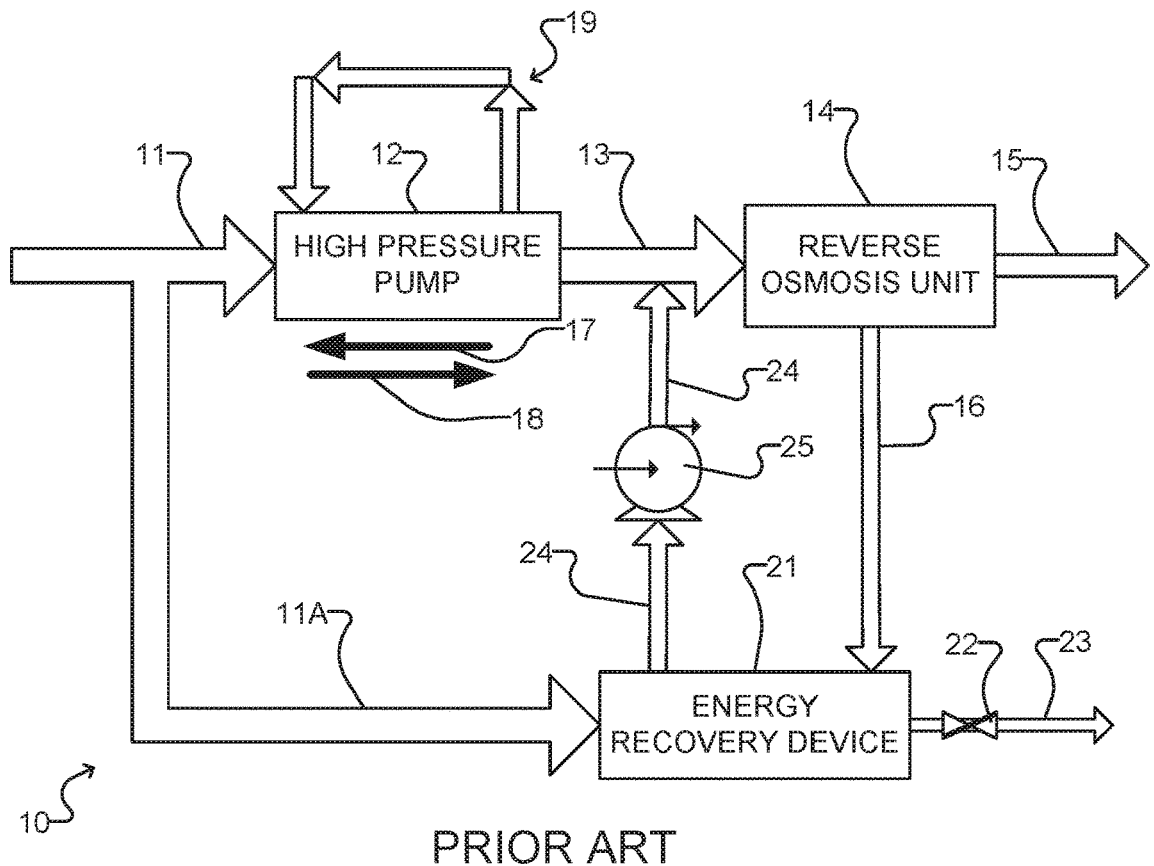
FIG. 1 shows an example of a desalination system with a high pressure pump and a reverse osmosis unit according to the prior art.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 1A:
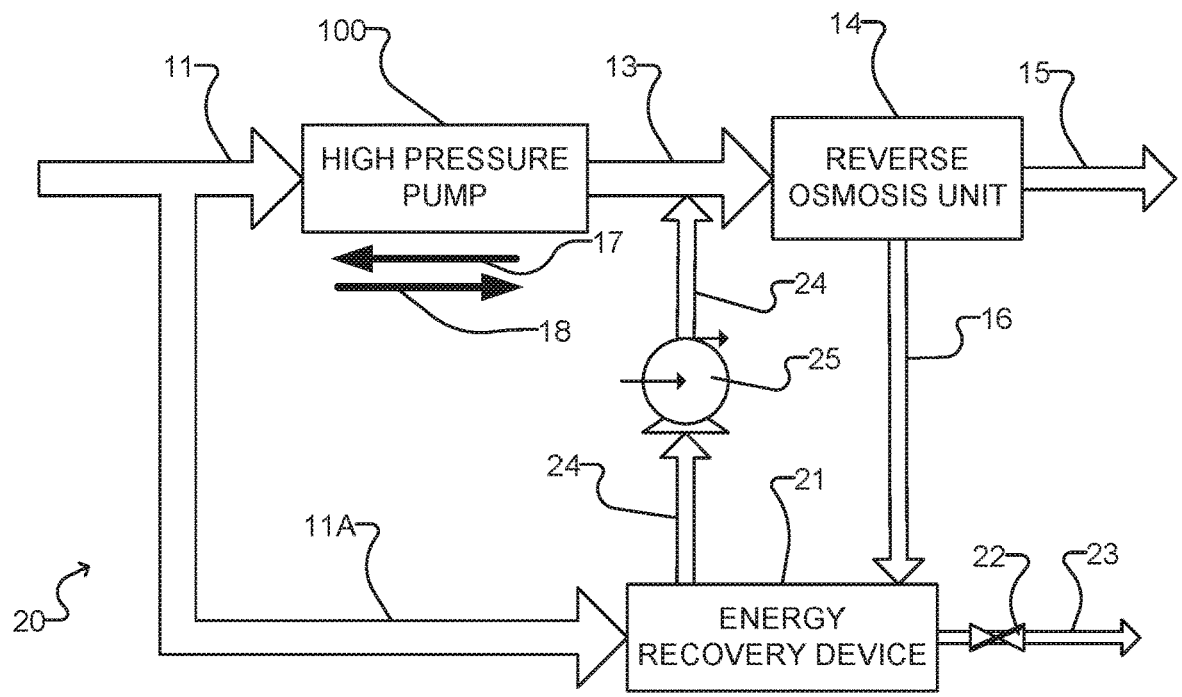
FIG. 1A shows an example of desalination system with a high pressure pump and a reverse osmosis unit according to one embodiment of the invention.

FIG. 1A shows a desalination system 20 according to one embodiment of the invention. The desalination system 20 of FIG. 1A is similar to the prior art system 10 discussed above, except that the system 20 of FIG. 1A has a high pressure pump 100 according to one embodiment of the present invention which comprises a dual acting bearing assembly. A pressure bleed-off circuit 19 is thus not required in the system 20 of FIG. 1A.

As described further below, the bearing assembly of the pump 100 is preferably lubricated by the process fluid (e.g. seawater) passing therethrough. By utilizing the process fluid to provide lubrication, the need for a separate lubricant such as oil or the like is avoided.

Figure 2:
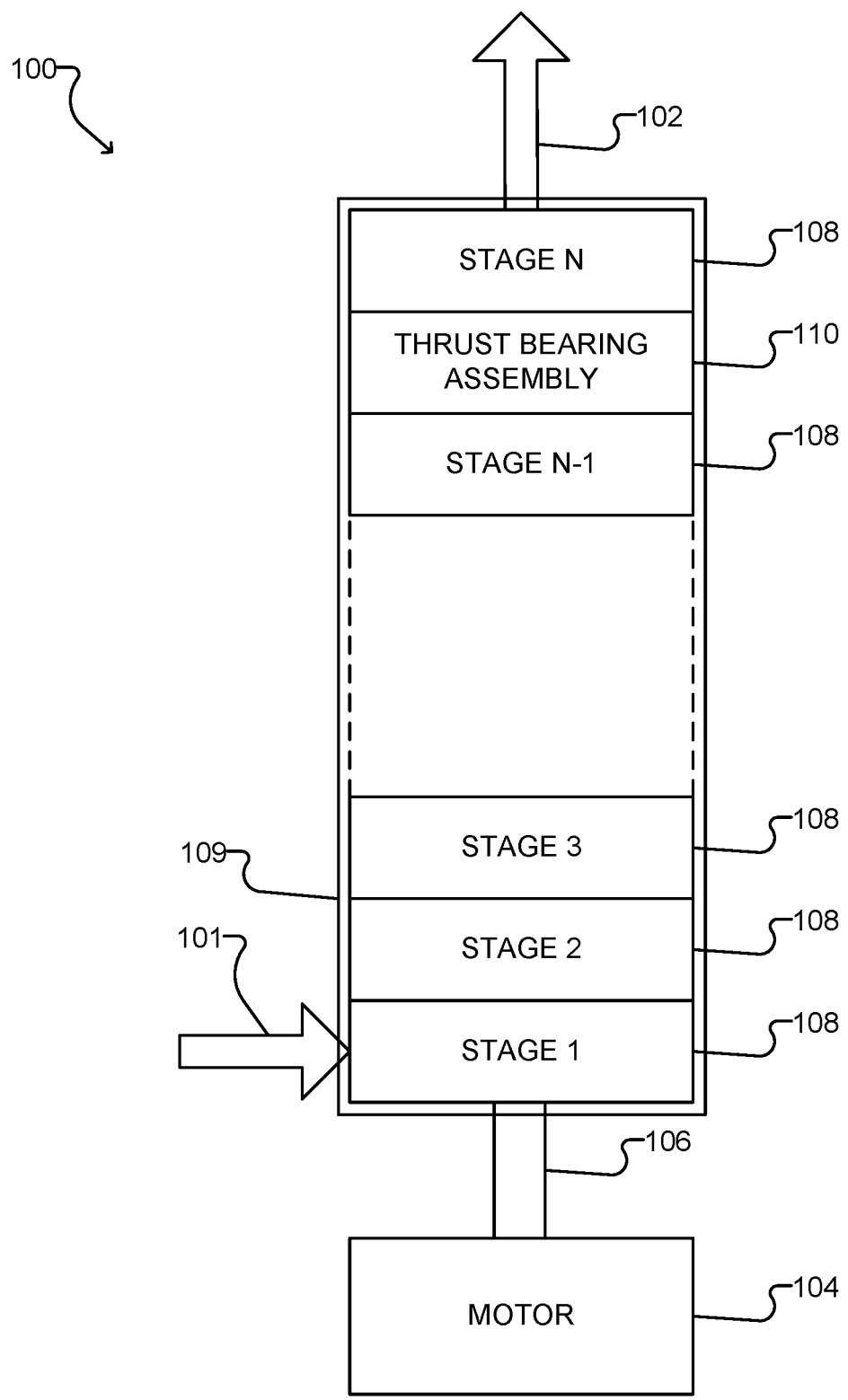
FIG. 2 is a block diagram of an example high pressure pump according to one embodiment of the invention.
Figure 3:
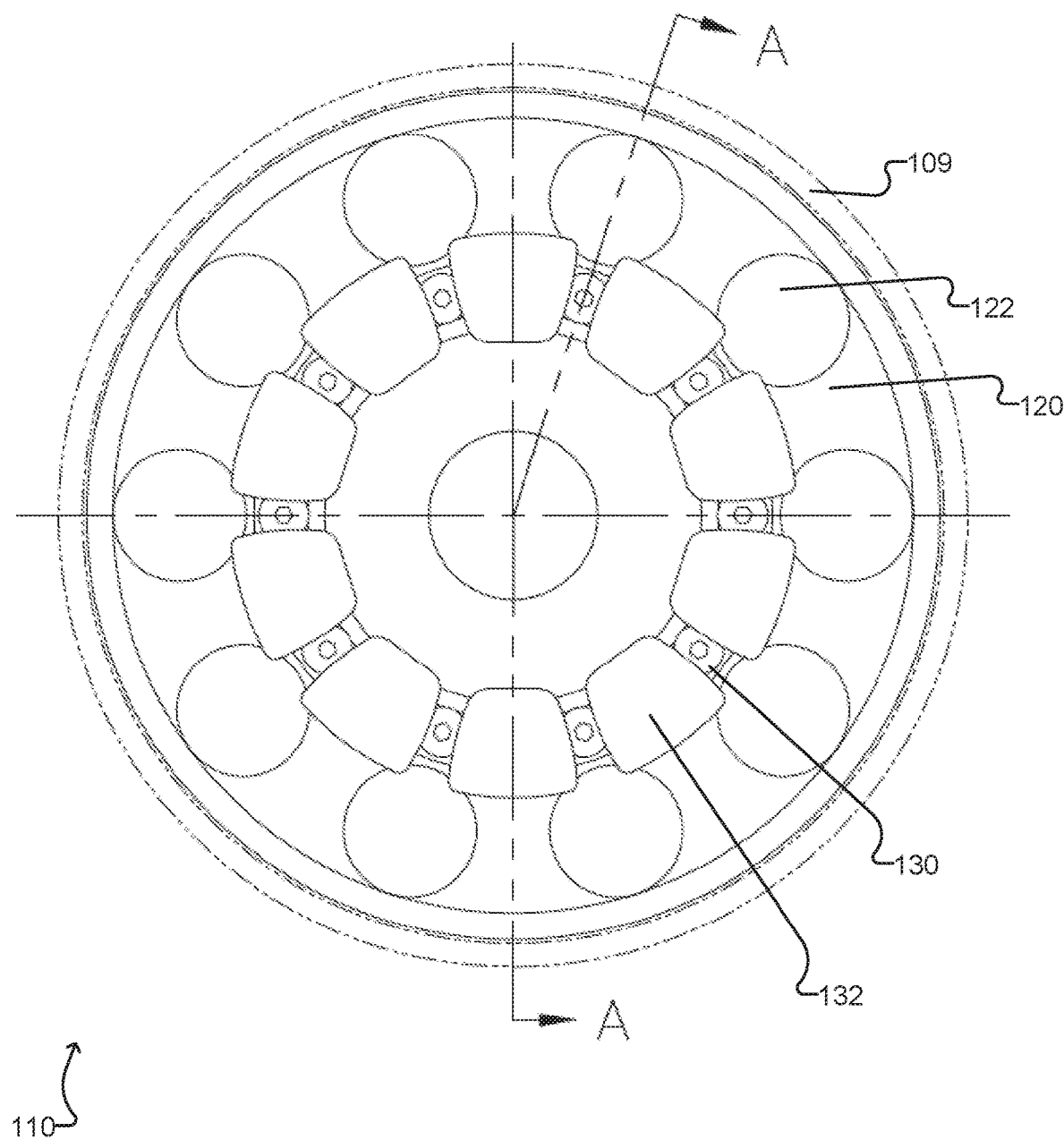
FIG. 3 is an axial view of an example thrust bearing for the pump of FIG. 3.

FIG. 2 schematically illustrates a centrifugal pump 100 according to one embodiment. The pump 100 receives low pressure process fluid 101 at an inlet port at or near one end of a casing 109 and discharges high pressure process fluid 102 from a discharge port at or near the other end of the casing 109. A motor 104 rotates a shaft 106 running through the pump 100. A plurality of impeller stages 108 successively increase the pressure of the process fluid. Each impeller stage comprises an impeller coupled to be driven by the shaft 106, and a diffuser held stationary with respect to the casing 109. A thrust bearing assembly 110 is positioned between the final two impeller stages 108. Details of an example implementation of the thrust bearing assembly are discussed below with reference to FIGS. 3 and 4.

Figure 4:
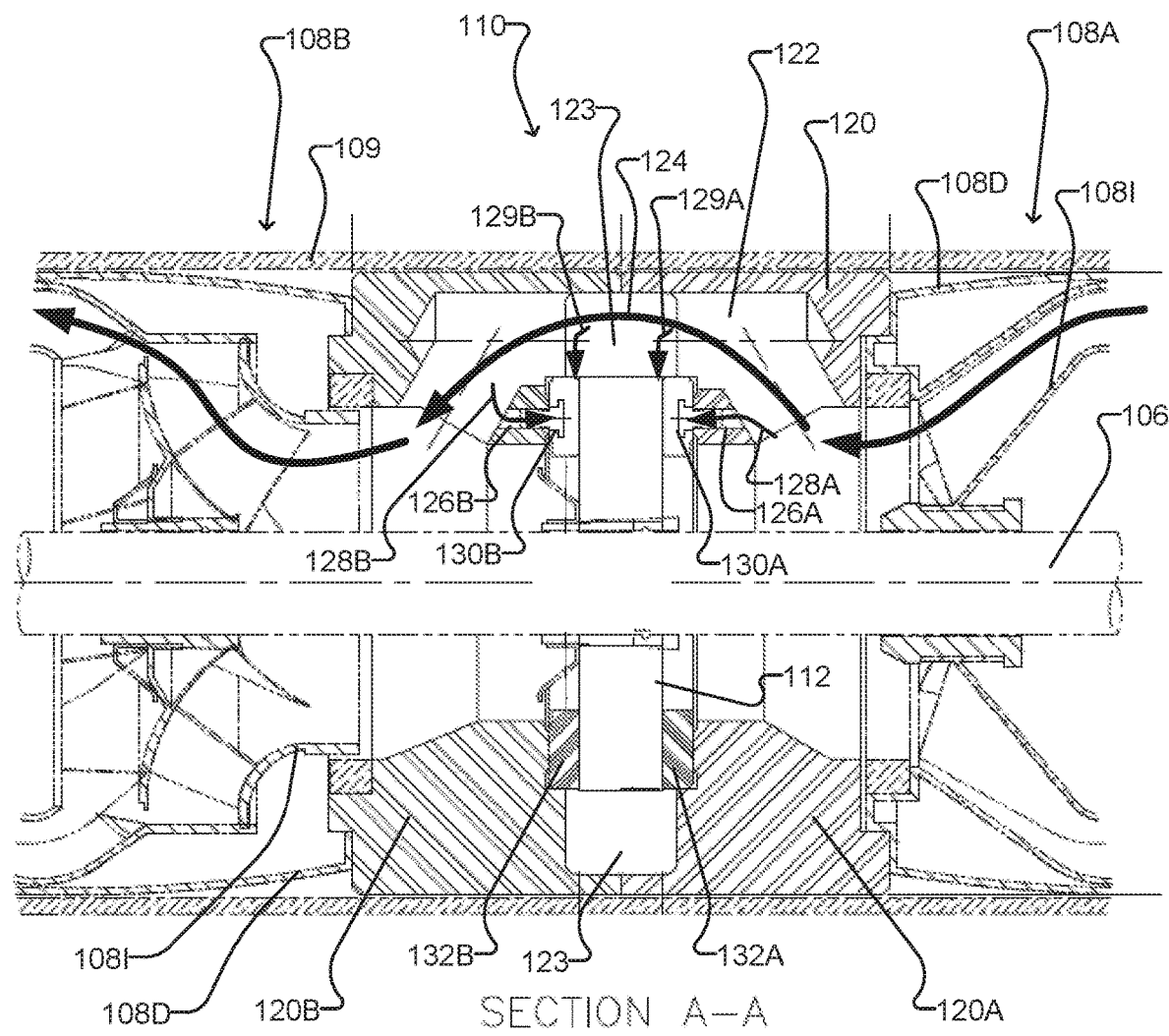
FIG. 4 is a sectional view taken along line A-A of FIG. 3.

Thrust bearing assembly 110 is housed within a casing 109 of the pump, and located downstream from of a next to last impeller stage 108A and upstream from a last impeller stage 108B of the pump. Portions of a diffuser 108D and an impeller 108I of each of the next to last and last impeller stages 108A and 108B are shown in FIG. 4. The bearing assembly 110 comprises a thrust collar 112 mounted on the shaft 106, and retained within a central cavity of a bearing housing 120. The bearing housing 120 is held stationary with respect to the casing 109, and may be sandwiched between the diffusers 108D of the next to last and last impeller stages 108A and 108B. In the illustrated embodiment, the bearing assembly 120 has a first side 120A and a second side 120B, which may be separate pieces.

A plurality of flow ports 122 are formed in the bearing housing 120 around a radial periphery of the central cavity (i.e., the flow ports 122 are positioned around the outside of the bearing housing, between the central cavity and the casing 109). Each of the flow ports 122 provides a main flow path 124 to allow process fluid to pass through the bearing assembly 110. The combined cross-sectional area of the flow ports 122 is sufficient to permit process fluid to flow smoothly between the final two stages of the pump 100.

An annular cavity 123 is also formed in the bearing housing 120. The annular cavity 123 is positioned around the radial periphery of the central cavity, and provides fluid communication between the flow ports 122 and the central cavity.

Because the bearing assembly 110 is between the final two stages 108A and 108B of the pump 100, the pressure of the fluid in the flow ports 122 is relatively high during operation of the pump 100. This high pressure assists in maintaining a lubricating film for the bearing assembly 110, as discussed further below. Also, positioning the bearing assembly 110 between the final two stages 108A and 108B of the pump 100 facilitates installation and maintenance of the bearing assembly 110, since only the last impeller stage 108B would need to be removed or disassembled to access the bearing assembly 110.

A plurality of first side lubrication ports 126A provide lubrication flow paths 128A for process fluid from the flow ports 122 to enter the central cavity from the first side. A plurality of second side lubrication ports 126B provide lubrication flow paths 128B for process fluid from the flow ports 122 to enter the central cavity from the second side. Process fluid also enters the central cavity from the annular cavity 123, as indicated by additional lubrication flow paths 129A and 129B. First and second side lubrication nozzles 130A and 130B are provided on the first and second sides 120A and 120B of the bearing housing 120 where the lubrication ports 126A and 126B meet the central cavity.

First and second side thrust pads 132A and 132B are provided on the first and second sides 120A and 120b of the bearing housing 120 facing toward the central cavity. The thrust pads 132A and 132B preferably comprise a friction-reducing material, such as for example a polyether ether ketone (PEEK) polymer or the like. In some embodiments, the thrust pads 132A and 132b may comprise solid blocks of a blend of bearing grade PEEK polymer, or other friction reducing material. In other embodiments, the thrust pads 132A and 132b may comprise metallic bases with a layer of friction reducing material sintered or otherwise deposited on the faces of the thrust pads 132A and 132B facing toward the thrust collar 112.

The spacing between the first side thrust pads 132A and the second side thrust pads 132b is slightly larger than an axial thickness of the thrust collar 112, such that the pads 132A and 132b constrain axial movement of the thrust collar 112 in either direction. Thus both active and reverse loading on the shaft 106 is accommodated.

The lubrication nozzles 130A and 130b direct process fluid from the lubrication flow paths 128A and 128B toward the interface between the thrust collar 112 and the respective thrust pads 132A and 132b, such that thin film of process fluid is maintained between the thrust collar 112 and the pads 132A and 132B. Process fluid from the annular cavity 123 also reaches the interface between the thrust collar 112 and the thrust pads 132A and 132B, as indicated by the additional lubrication flow paths 129A and 129B. The process fluid provides lubrication and also cooling at the interface between the thrust collar 112 and the pads 132A and 132B.

The particular details of construction of the bearing assembly may vary in a number of ways. For example, the flow ports and the lubrication ports could have different shapes and locations than those shown in the drawings. In some embodiments, a different number of pads could be located on either side of the thrust collar. In some embodiments, two separate thrust collars or other annular rotatable elements could be provided, one for accommodating force in each direction. In some embodiments, separate bearings may be provided for accommodating force in each direction. In some embodiments, instead of the whole bearing assembly being located in the same part of the pump, a bearing for accommodating force in one direction could be in one part of the pump and a bearing for accommodating force in the other direction could be located in another part of the pump.

The example embodiment shown in the figures has a number of advantages. For example, it is a single unit, making economical use of a single collar. Both the forward and reverse thrust pads and the collar are located in a part of the pump likely to have sufficient water pressure to maintain a film of lubricating water when required. In some embodiments, the bearing assembly is symmetrical so as to avoid reverse assembly errors and provide a single part that can be specified with a single max pressure in either direction, as opposed to being custom made for other applications with a different ratio of forward to reverse thrust.

Bearing assemblies according to certain embodiments of the invention advantageously avoid the need for external lubrication or cooling systems. Further, due to the placement of the bearing assembly between the final two stages of the pump, the bearing assembly is always flooded with process fluid even during startup or sudden stops of the pump. Such bearing assemblies may be particularly advantageous when applied in high pressure pumps used in reverse osmosis systems for desalination of seawater.

The present disclosure may be embodied in other specific forms without departing from its spirit or essential characteristics. The described embodiments are to be considered in all respects only as illustrative and not restrictive.

The invention claimed is:

1. A pump comprising:
a casing having an inlet for receiving a fluid at a first end and an outlet for discharging the fluid at a second end at a higher pressure;
a shaft within the casing rotatable about an axis and moveable along an axial direction;
a plurality of impeller stages, each impeller stage comprising an impeller coupled to rotate with the shaft and a diffuser held stationary within the casing;
a bearing assembly within the casing, the bearing assembly comprising:
one or more annular elements coupled to rotate with the shaft,
one or more bearing housings coupled to the casing:
a plurality of first thrust pads coupled to one of the bearing housings and facing toward the first end of the casing positioned to bear against at least one of the one or more annular elements when the shaft moves along the axial direction from the first end toward the second end;
a plurality of second thrust pads coupled to one of the bearing housings and facing toward the second end of the casing positioned to bear against at least one of the one or more annular elements when the shaft moves along the axial direction from the second end toward the first end; and,
a plurality of ports through the one or more bearing housings providing flow paths for some of the fluid within the casing to pass through the one or more bearing housings and lubrication paths directing some of the fluid within the casing toward interfaces between the first thrust pads and the at least one of the one or more annular elements that bear against the first thrust pads and between the second thrust pads and the at least one of the one or more annular elements that bear against the second thrust pads.

2. The pump of claim 1 wherein:
the one or more annular elements comprise a thrust collar coupled to rotate with the shaft;
the one or more bearing housings are located between adjacent impeller stages of the pump, and comprise a first side towards the first end of the casing and a second side toward the second end of the pump casing, and define a central cavity for receiving the thrust collar; and,
the plurality of ports comprise a plurality of flow ports arranged around a radial periphery of the central cavity, each of the flow ports providing communication of the fluid between the first side of the one or more bearing housings and the second side of the one or more bearing housings, and, a plurality of first side lubrication ports and second side lubrication ports each having an associated flow port, each first side lubrication port extending from the associated flow port toward the central cavity from the first side and each second side lubrication port extending from the associated flow port toward the central cavity from the second side.

3. The pump of claim 2 wherein the bearing assembly is symmetric about a plane of symmetry perpendicular to an axis of rotation of the thrust collar.

4. The pump of claim 2 wherein the first side and the second side of the one or more bearing housings are constructed in two separate portions.

5. The pump of claim 2 wherein one of the lubrication ports and an associated lubrication nozzle is located between each pair of adjacent thrust pads.

6. The pump of claim 2 wherein each of the flow ports has one of the first side lubrication ports extending from a first end thereof to the central cavity and one of the second side lubrication ports extending from a second end thereof to the central cavity.

7. The pump of claim 2 wherein the one or more bearing housings define an annular cavity positioned around the radial periphery of the central cavity, the annular cavity providing fluid communication between the plurality of flow ports and the central cavity.

8. The pump of claim 1 wherein the bearing assembly is positioned between a last impeller stage closest to the outlet and a next to last impeller stage.

* * * * *